United States Patent
Jeon et al.

(10) Patent No.: US 10,854,944 B2
(45) Date of Patent: Dec. 1, 2020

(54) MULTI-BAND SPNT SWITCH USING VARIABLE L/4 TRANSMISSION LINES, AND SWITCH MATRIX AND TRANSMITTER AND RECEIVER SYSTEM INCLUDING THE SPNT SWITCH

(71) Applicant: KOREA UNIVERSITY RESEARCH AND BUSINESS FOUNDATION, Seoul (KR)

(72) Inventors: Sanggeun Jeon, Seoul (KR); Younghwan Kim, Jeju-si (KR)

(73) Assignee: Korea University Research and Business Foundation, Seoul (KR)

( * ) Notice: Subject to any disclaimer, the term of this patent is extended or adjusted under 35 U.S.C. 154(b) by 169 days.

(21) Appl. No.: 16/115,878

(22) Filed: Aug. 29, 2018

(65) Prior Publication Data

US 2019/0074566 A1    Mar. 7, 2019

(30) Foreign Application Priority Data

Sep. 7, 2017    (KR) .......................... 10-2017-0114503

(51) Int. Cl.
| | | |
|---|---|---|
| H01Q 1/50 | (2006.01) | |
| H01P 5/12 | (2006.01) | |
| H01P 1/10 | (2006.01) | |
| H04B 1/44 | (2006.01) | |
| H04B 1/00 | (2006.01) | |

(52) U.S. Cl.
CPC .................. *H01P 5/12* (2013.01); *H01P 1/10* (2013.01); *H01Q 1/50* (2013.01); *H04B 1/006* (2013.01); *H04B 1/44* (2013.01)

(58) Field of Classification Search
CPC .. H01Q 1/50; H03H 11/04; H01P 5/12; H01P 1/10; H04B 1/006; H04B 1/44
USPC .......................................................... 343/876
See application file for complete search history.

(56) References Cited

U.S. PATENT DOCUMENTS

| | | | | |
|---|---|---|---|---|
| 2010/0248652 A1* | 9/2010 | Feng | .......................... | H01P 1/10 455/78 |
| 2012/0295554 A1* | 11/2012 | Greene | ................ | H04B 1/0458 455/77 |
| 2014/0327495 A1* | 11/2014 | He | .......................... | H01H 9/54 333/103 |
| 2015/0054594 A1 | 2/2015 | Apriyana et al. | | |
| 2016/0126945 A1* | 5/2016 | Ma | .......................... | H03K 17/76 375/219 |
| 2016/0226484 A1* | 8/2016 | Lu | .......................... | H03K 17/687 |
| 2017/0141759 A1* | 5/2017 | Srirattana | ............... | H03H 11/04 |
| 2018/0131368 A1* | 5/2018 | Lu | ............................ | H04B 1/44 |

OTHER PUBLICATIONS

Korean Office Action dated Sep. 6, 2018 in corresponding Korean Patent Application No. 10-2017-0114503 (3 pages in Korean).

* cited by examiner

*Primary Examiner* — Hai V Tran
(74) *Attorney, Agent, or Firm* — NSIP Law

(57) ABSTRACT

Provided is a Single Pole N Throw (SPNT) switch including: a transmission line unit including a plurality of transmission lines each connected between a plurality of selection terminals and a single common terminal; and a SPST switch unit including a plurality of SPST switches for grounding each of the plurality of transmission lines, wherein the SPST switches allows at least a part of the plurality of transmission lines and other transmission lines to operate as open nodes at the common terminal for different frequencies.

6 Claims, 9 Drawing Sheets

MULTI-BAND SPNT SWITCH USING VARIABLE L/4 TRANSMISSION LINES, AND SWITCH MATRIX AND TRANSMITTER AND RECEIVER SYSTEM INCLUDING THE SPNT SWITCH

CROSS-REFERENCE TO RELATED APPLICATIONS

This U.S. non-provisional patent application claims priority under 35 U.S.C. § 119 of Korean Patent Application No. 10-2017-0114503, filed on Sep. 7, 2017, the entire contents of which are hereby incorporated by reference.

BACKGROUND

The present disclosure relates to a wireless application system operating in RF, microwave, millimeter wave, and terahertz bands, and more particularly, to a Single Pole N Throw (SPNT) switch necessary for RF circuits, wireless transmitter and receiver systems, and radars which perform multiplexing or demultiplexing of multi-band signals.

In general, the structures for implementing a SPNT switch includes (a) a structure in which a Single Pole Single Throw (SPST) switch is serially connected to a transmission path to form an open node when the SPST switch is off, (b) a structure in which a SPST switch is connected in parallel to form ground GND when the SPST switch is on, and (c) a structure of mixing both. FIG. 1 is a view schematically showing the concept of an SPNT switch, and FIG. 2 is a view showing the implementation structure of an SPNT switch.

At this time, the off-resistance of the SPST switch is related to the isolation of the input and output terminals of the SPNT switch. The isolation increases as the off-resistance increases. The on-resistance of the SPST switch is a parameter related to the insertion loss of the switch. In order to lower the insertion loss, the on-resistance of the SPST switch must be minimized.

FIG. 3 is an equivalent circuit diagram of an SPST switch where a SPST switch element such as a transistor or a diode is connected in series or in parallel. As shown in FIG. 3, when a RF switch is configured, the off-capacitance of the SPST switch related to frequency response must be further considered in addition to the on and off-resistances of the switch.

In general, the isolation performance of the SPST switch is degraded by the off-capacitance. The performance degradation of the SPST switch also adversely affects the operation of the SPNT switch, so that insertion loss and isolation of each path are also degraded.

In the frequencies as high as or higher than a millimeter band of several tens of GHz, the performance degradation of the RF SPST switch and SPNT switch due to such an off-capacitance becomes much larger in the series configuration than in the parallel configuration. Thus, in the frequencies as high as or higher than a millimeter band, the parallel configuration is preferred for the SPST switch and SPNT switch configuration.

As shown in FIG. 2(b), in the case of an RF SPNT switch in which SPST switches are configured in parallel, the on-path should minimize the insertion loss of the input signal by matching the characteristic impedance of the input and output terminals. At this time, the SPST switch is off, such that the SPNT switch becomes on.

The SPST switch that is included in the off-path of SPNT switch is connected to the ground (GND) so that the input signal flows to GND, not to the output terminal. At this time, the SPST switch is on, such that the SPNT switch becomes off.

In order to prevent the output impedance of the SPNT switch from being changed by the SPST switch of off-path, the SPST switch of off-path is configured as the switch element combined with a quarterwave ($\lambda/4$) transmission line (TL). This makes the impedance seen looking into the SPST switch of off-path open, so that the output impedance of the SPNT switch does not change. The physical length of the quarterwave ($\lambda/4$) transmission line (TL) is determined by the operating frequency. FIG. 2(b) is an SPNT switch that operates at a single frequency of $f_1$. At this time, the physical length of the quarterwave ($\lambda/4$) transmission line is fixed at $f_1$. It means the transmission line does not behavior as quarterwave ($\lambda/4$) anymore at other frequencies.

At frequencies other than $f_1$, the quarterwave ($\lambda/4$) transmission line does not behavior as quarterwave ($\lambda/4$), so that the impedance seen looking into the SPST switch of off-path deviates from open and shows an arbitrary impedance. This makes difficult to keep desirable input and output impedances and desirable isolation performance of the SPNT switch at frequencies other than $f_1$. Therefore, this type of SPNT switch structure is used only at a single frequency, and cannot be used at multi-band frequencies.

FIG. 4 is a view showing an example in which a SP3T switch employing the conventional structure of FIG. 2(b) is used at multi-band frequencies, $f_1$, $f_2$, and $f_3$. In FIG. 4, the physical length of transmission line included in each switch path is determined as a quarterwave ($\lambda/4$) at the input frequency of the switch path ($f_1$, $f_2$, or $f_3$). If the switch path at $f_1$ is on, the other two switch paths at $f_2$ and $f_3$ must be off. For this operation, two quarterwave ($\lambda/4$) transmission lines connected to the two switch paths at $f_2$ and $f_3$ must behavior as a quarterwave ($\lambda/4$) at $f_1$ as well.

However, the physical length of the two quarterwave ($\lambda/4$) transmission lines are determined and fixed at $f_2$ and $f_3$. Therefore, the two quarterwave ($\lambda/4$) transmission lines cannot behavior as a quarterwave ($\lambda/4$) at $f_1$. This leads to significant leakage of input signal at $f_1$ into the other two switch paths ($A_{12}$ and $A_{13}$). For this reason, the conventional SPNT switch structure may not be extended and used for multi-band frequencies.

SUMMARY

The present disclosure provides a parallel matrix SPNT switch used in multiple bands, and a switch matrix and a transmitter and receiver system including the SPNT switch.

An embodiment of the inventive concept provides a Single Pole N Throw (SPNT) switch including: a transmission line unit including a plurality of transmission lines each connected between a plurality of selection terminals and a single common terminal; and a SPST switch element including a plurality of SPST switches for grounding each of the plurality of transmission lines, wherein the SPST switch unit allows at least a part of the plurality of transmission lines and other transmission lines to operate as open nodes at the common terminal at different frequencies.

In an embodiment, the SPST switch is located at a quarterwave ($\lambda/4$) away from the common node on the output. In an embodiment, the SPST switches are connected to different positions at a transmission line.

In an embodiment the SPST switches located between ground connected SPST switch (turned-on SPST switch, which is located at quarterwave away from single common terminal with operating frequency) and input terminal can helps composing better open node quality with turning-on.

Provided is an SPNT switch matrix in which common terminals of SPNT switches are connected to each other, wherein a Single Pole N Throw (SPNT) switch includes: a transmission line unit including a plurality of transmission lines each connected between the plurality of selection terminals and the single common terminal; and a SPST switch for grounding each of the plurality of transmission lines, wherein the SPST switches allows at least a part of the plurality of transmission lines and other transmission lines to operate as open nodes at the common terminal at different frequencies.

In an embodiment of the inventive concept, provided is a transmitter and receiver system including a transmitting and receiving antenna, which are connected to each of common terminals of different SPNT switches having a plurality of selection terminals and a single common terminal, wherein a Single Pole N Throw (SPNT) switch includes: a transmission line unit including a plurality of transmission lines each connected between the plurality of selection terminals and the single common terminal; and a SPST switch for grounding each of the plurality of transmission lines, wherein the SPST switch unit allows at least a part of the plurality of transmission lines and other transmission lines to operate as open nodes at the common terminal at different frequencies.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, preferred embodiments of the present invention will be described with reference to the accompanying drawings.

Figure 1:
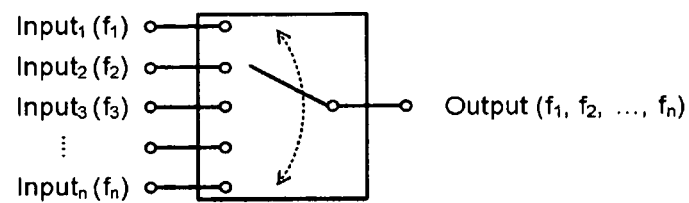
FIG. 1 is a view schematically showing the concept of a multi-band SPNT switch.
Figure 2:
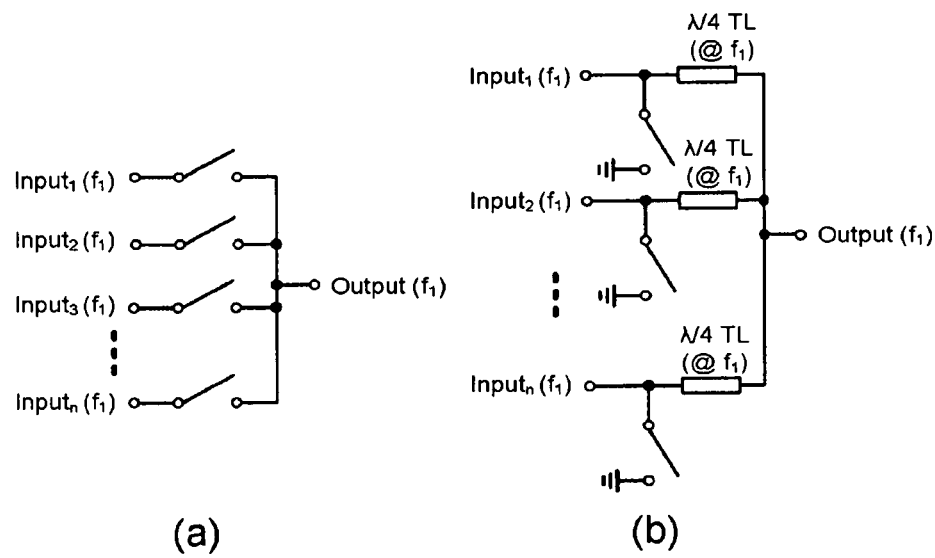
FIG. 2 is a view showing the structure forms of implementations of a conventional single-band SPNT switch.
Figure 3:
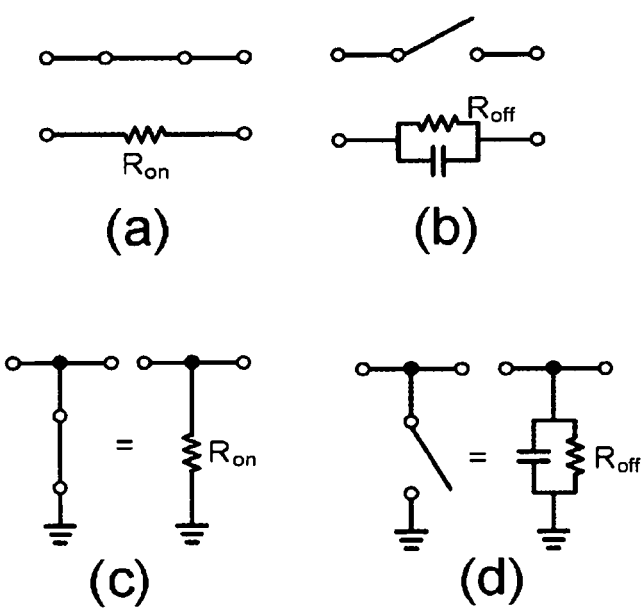
FIG. 3 is an equivalent circuit diagram of a SPST switch element connected in series or in parallel using a transistor or a diode.
Figure 4:
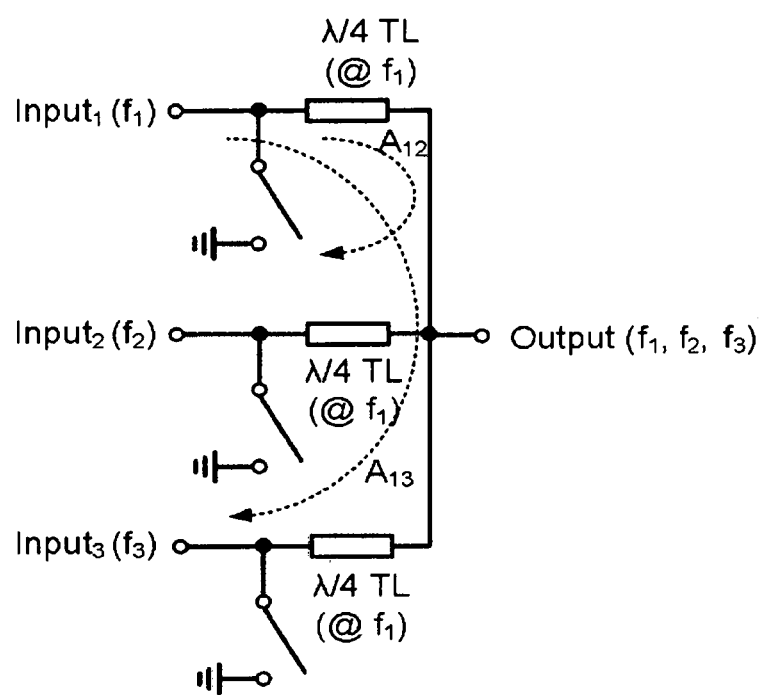
FIG. 4 is a view of an example showing that a conventional SP3T switch structure cannot be used for multi-band operation as itself.
Figure 5:
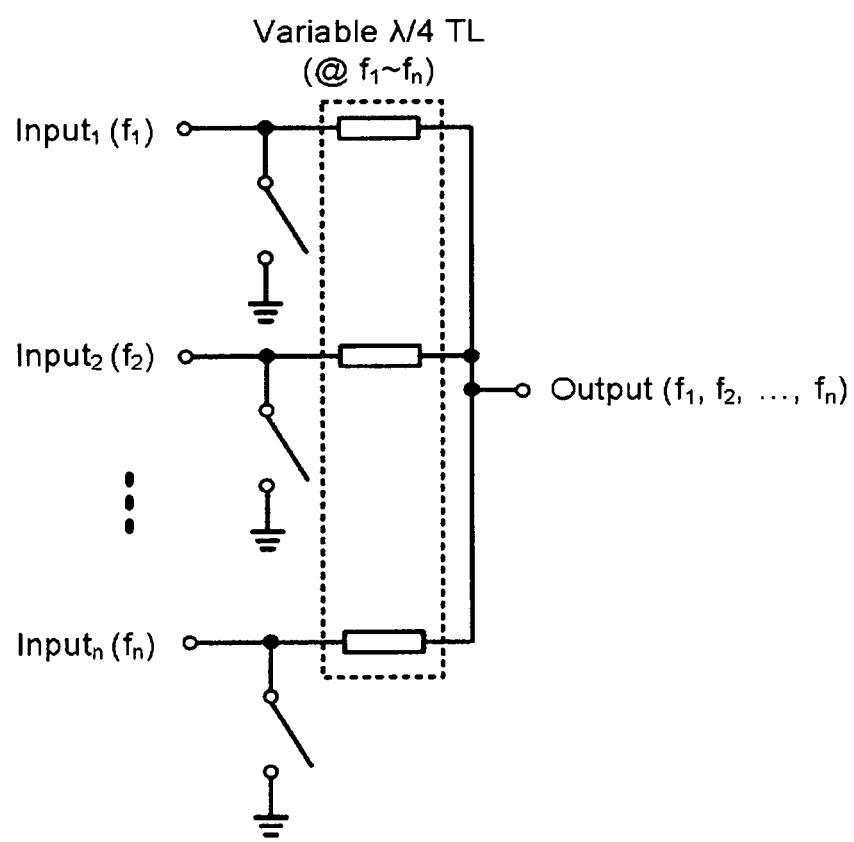
FIG. 5 is a view schematically showing the concept of a multi-band SPNT switch according to an embodiment of the present invention.
Figure 6:
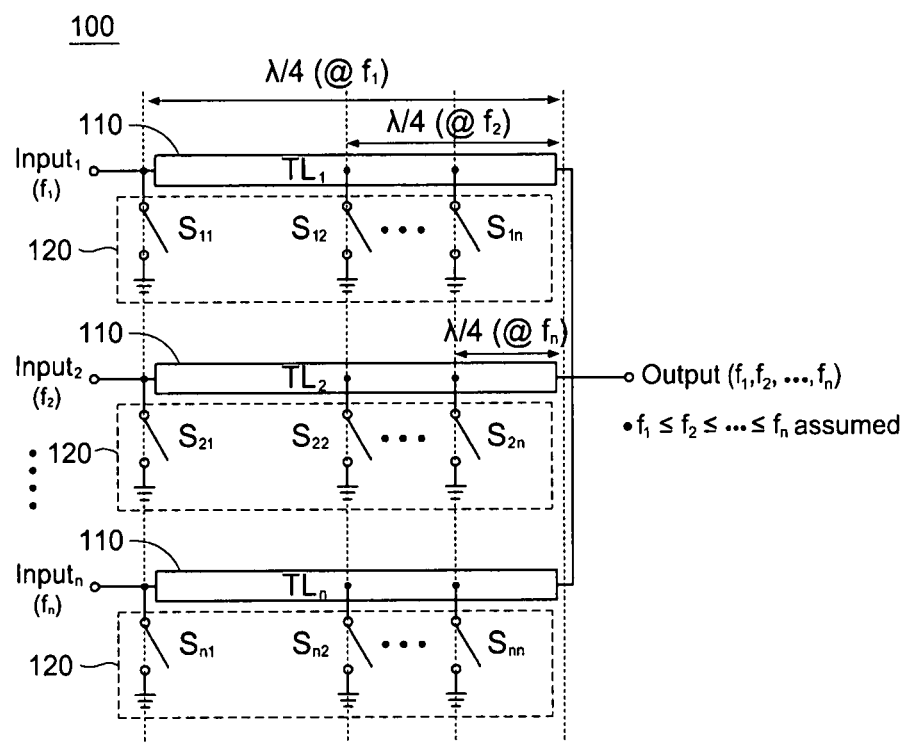
FIG. 6 is a view of one embodiment of the multi-band SPNT switch of FIG. 5.

FIG. 5 is a view schematically showing the concept of a multi-band SPNT switch according to an embodiment of the present invention, and FIG. 6 is a view of one embodiment of the multi-band SPNT switch of FIG. 5. In FIG. 6, N SPST switches 120 are included in parallel in each path of the multi-band SPNT switch 100 having N inputs. Any kind of switch elements such as transistors and diodes may be used as an SPST switch used in the configuration of the multi-band SPNT switch.

The width of the transmission line 110 included in each path of the multi-band SPNT switch is selected based on the input/output characteristic impedance, and is used to adjust the quality factor in order to resonate the parasitic component generated by the SPST switch or to control the bandwidth of the multi-band SPNT switch. Also, instead of keeping the width of the transmission line at a constant value, the transmission line may be implemented, such that the width varies from an input terminal to an output terminal to improve the switch performance.

Figure 7:
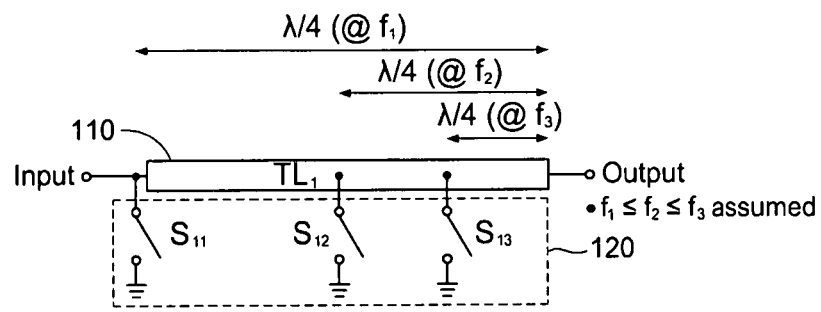
FIG. 7 is an enlarged view of a part of the transmission line of a transmission line unit of FIG. 5.

FIG. 7 is an enlarged view of a part of the transmission line of a transmission line unit of FIG. 5. The physical length of the transmission line is determined to be quarterwave ($\lambda/4$) at the minimum input frequency $f_1$.

The fixed physical length of the transmission line corresponds to a different electrical length at each different operating frequency. For example, when the input frequencies are composed of $f_1$ and its harmonic components (e.g., $f_1$, $2f_1$, $3f_1$, ..., $Nf_1$), the length of the transmission line included in each switching path is fixed to quarterwave ($\lambda/4$) at the minimum input frequency $f_1$. However, the transmission line appears to be $\lambda/2$ at $2f_1$ and $N\lambda/4$ at $Nf_1$.

Even if the length of the transmission line is theoretically set to quarterwave ($\lambda/4$) at $f_1$ that is the minimum input frequency, the practically designed length may be adjusted to resonate the parasitic impedance of the SPST switch or to improve the operating bandwidth of the multi-band SPNT switch.

Several SPST switches are connected in parallel to the transmission line 110. The number of the SPST switches is the same as the number of different input frequencies. Each SPST switch corresponds to each input frequency. When $S_{11}$ (or $S_{12}$ or $S_{13}$) is on, the transmission line ($TL_1$) becomes a shorted quarterwave stub at $f_1$ (or $f_2$ or $f_3$) at the output, respectively. In this principle, a variable quarterwave line shown in FIG. 5 is practically implemented at multi-band frequencies.

The on-path of the multi-band SPNT switch is configured such that all the SPST switches connected in parallel are turned off so that the input signal is conducted directly to the output terminal. The remaining off-paths of the multi-band SPNT switch are configured such that only one SPST switch corresponding to the operation frequency is turned on. Therefore, all remaining off-paths present an open condition to the common output terminal, so that no input signal is leaked into the off-paths.

In the remaining off-paths, the on-off state of the other SPST switches located closer to the input terminal than the on SPST switch has theoretically no effect on the SPNT switch operation. However, in actual operation, it is preferable that all of them are turned on to stably set the ground (GND).

Figure 8:
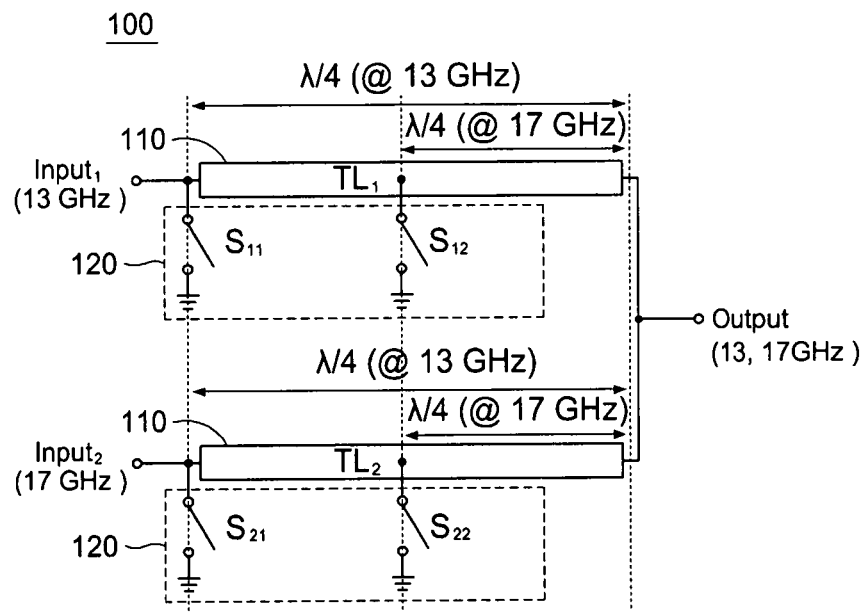
FIG. 8 is a schematic view of an example in which the multi-band SPNT switch of FIG. 6 is implemented as a dual-band SP2T.

FIG. 8 is a schematic view of an example in which the multi-band SPNT switch of FIG. 6 is implemented as a dual-band SP2T. The DC bias circuit is not shown in FIG. 8. In FIG. 8, an SP2T includes two input terminals such as $Input_1$ receiving 13 GHz input signal and $Input_2$ receiving 17 GHz input signal.

$S_{11,21}$ are connected in parallel to the transmission lines $TL_{1,2}$ at positions having an electrical length of quarterwave ($\lambda/4$) at 13 GHz from the output terminal, respectively. $S_{12,22}$ are connected in parallel to the transmission lines $TL_{1,2}$ at positions having an electrical length of quarterwave ($\lambda/4$) at 17 GHz from the output terminal.

In the 13 GHz mode, in which the input terminal of 13 GHz is connected to the output terminal, $S_{11,12}$ included in the path operate in the off state. At this time, $S_{21}$ in the path of $Input_2$ (17 GHz) is in the on state, and makes $TL_2$ a short-stub having an electrical length of quarterwave ($\lambda/4$) at 13 GHz (frequency of signal applied to $Input_1$ (13 GHz)). At the output terminal, the 17 GHz path appears as an open node.

In the 17 GHz mode, in which the input terminal of 17 GHz is connected to the output terminal, $S_{21,22}$ included in the path operate in the off state. At this time, $S_{12}$ in the path of $In13$ is in the on state, and makes a portion of $TL_1$ a short-stub having an electrical length of quarterwave ($\lambda/4$) at 17 GHz (frequency of signal applied to $Input_2$). At the output terminal, the 13 GHz path appears as an open node.

It is also possible to interchange the two input signals applied to the dual-band SP2T without performance degradation. It is also possible to use the dual-band SP2T as a single-band SP2T by applying a single frequency, either 13 GHz or 17 GHz, to both input terminals.

In FIG. 8, when a signal of 13 GHz is applied to the $Input_1$ input terminal and a signal of 17 GHz is applied to the $Input_2$ input terminal, $S_{11}$ and $S_{22}$ may be deleted to improve the performance of the SP2T switch. On the other hand, when 17 GHz signal is applied to the $In_{13}$ input terminal and 13 GHz signal is applied to the $Input_2$ input terminal, $S_{12}$ and $S_{21}$ may be deleted.

Figure 9:
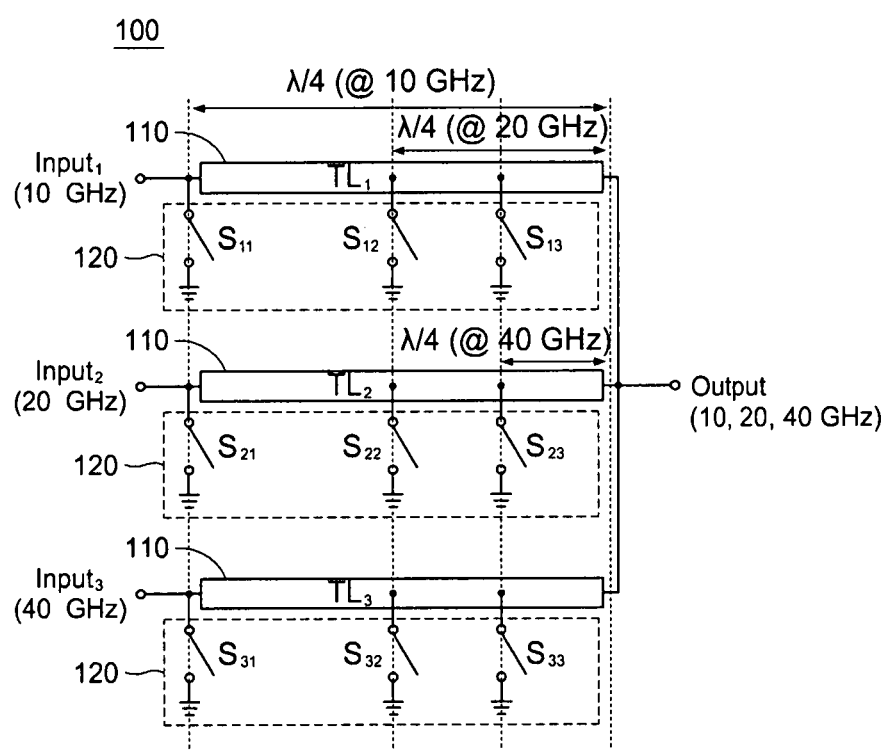
FIG. 9 is a schematic view of an example in which the multi-band SPNT switch of FIG. 6 is implemented as a triple-band SP3T.

FIG. 9 is a schematic view of an example in which the multi-band SPNT switch of FIG. 6 is implemented as a triple-band SP3T switch. The DC bias circuit is not shown in FIG. 9. In FIG. 9, a multi-band SP3T switch includes three input terminals such as $Input_1$ receiving 10 GHz input, $Input_2$ receiving 20 GHz input, and $Input_3$ receiving 40 GHz input.

$S_{11,21,31}$ are connected in parallel with the transmission lines $TL_{1,2,3}$ respectively, at positions having an electrical length of quarterwave ($\lambda/4$) at 10 GHz from the output terminal. $S_{12,22,32}$ are connected in parallel with the transmission lines $TL_{1,2,3}$ respectively, at positions having an electrical length of quarterwave ($\lambda/4$) at 20 GHz from the output terminal. $S_{13,23,33}$ are connected in parallel with the transmission lines $TL_{1,2,3}$ respectively, at positions having an electrical length of quarterwave ($\lambda/4$) at 40 GHz from the output terminal.

In the 10 GHz mode, in which the input terminal of 10 GHz is connected to the output terminal, the $S_{11,12,13}$ included in the path operate in the off state. $S_{21}$ in the path of $Input_2$ is in the on state, and makes $TL_2$ a short-stub having an electrical length of quarterwave ($\lambda/4$) at 10 GHz (frequency of signal applied to $Input_1$). At the output terminal, the 20 GHz path appears as an open node.

$S_{31}$ in the path of $Input_3$ is in the on state, and makes $TL_3$ a short-stub having an electrical length of quarterwave ($\lambda/4$) at 10 GHz (frequency of signal applied to $Input_1$). At the output terminal, the 40 GHz path appears as an open node.

In the 20 GHz mode, in which the input terminal of 20 GHz is connected to the output terminal, $S_{21,22,23}$ included in the path operate in the off state. At this time, $S_{11,12}$ in the path of $Input_1$ is in the on state, and makes a portion of $TL_1$ a short-stub having an electrical length of quarterwave ($\lambda/4$) at 20 GHz (frequency of signal applied to $Input_2$). At the output terminal, the 10 GHz path appears as an open node.

$S_{31,32}$ in the path of $Input_3$ is in the on state, and makes a portion of $TL_3$ a short-stub having an electrical length of quarterwave ($\lambda/4$) at 20 GHz (frequency of signal applied to $Input_2$). At the output terminal, the 40 GHz path appears as an open node.

In the 40 GHz mode, in which the input terminal of 40 GHz is connected to the output terminal, $S_{31,32,33}$ included in the path operate in the off state. At this time, $S_{11,12,13}$ in the path of $In_{10}$ is in the on state, and makes a portion of $TL_1$ a short-stub having an electrical length of quarterwave ($\lambda/4$) at 40 GHz (frequency of signal applied to $Input_3$). At the output terminal, the 10 GHz path appears as an open node.

$S_{21,22,23}$ in the path of $Input_2$ is in the on state, and makes a portion of $TL_3$ a short-stub having an electrical length of quarterwave ($\lambda/4$) at 40 GHz (frequency of signal applied to $Input_3$). At the output terminal, the 20 GHz path appears as an open node.

It is also possible to interchange three input signals applied to the triple-band SP3T switch without performance degradation. It is also possible to use the triple-band SP3T switch as a single-band SP3T switch by applying a single frequency, among 10 GHz, 20 GHz or 40 GHz, to all of the three input terminals. It is also possible to use the triple-band SP3T switch as a dual-band SP3T switch in a similar way.

In FIG. 9, when a signal of 10 GHz is applied to the $Input_1$ input terminal, a signal of 20 GHz is applied to the $Input_2$ input terminal, and a signal of 40 GHZ is applied to the $Input_3$ input terminal, $S_{11}$, $S_{22}$, and $S_{33}$ may be deleted to improve the performance of the SP3T switch.

Figure 10:
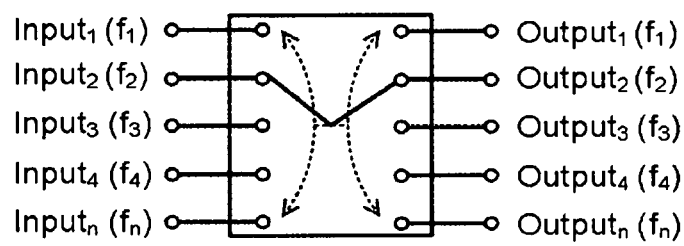
FIG. 10 is a view schematically showing the concept of a multi-band SPNT switch matrix according to an embodiment of the present invention.
Figure 11:
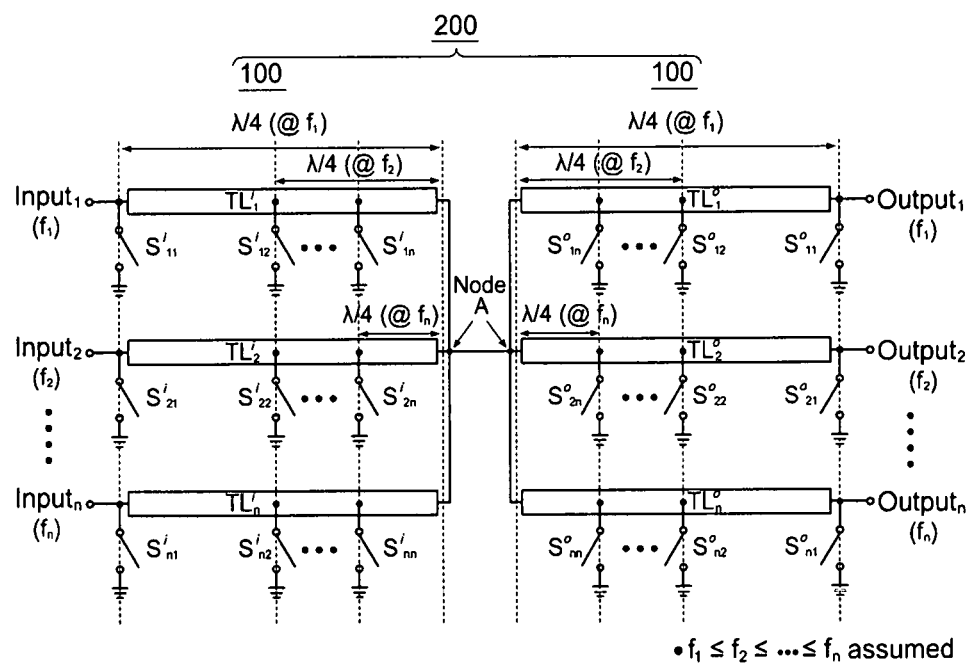
FIG. 11 is a view of one embodiment of the multi-band SPNT switch matrix of FIG. 10.

FIG. 10 is a view schematically showing the concept of a multi-band SPNT switch matrix according to an embodiment of the present invention, and FIG. 11 is a view of one embodiment of the multi-band SPNT switch matrix of FIG. 10.

To implement the block diagram of FIG. 10, the configuration of the M×N switch matrix 200 is possible by mirroring and cascading two SPNT switches 100, as shown in FIG. 11. For example, in the case where $Input_2$ and $Output_2$ are conducted and the signal of $f_2$ is transmitted in FIG. 11, switches connected to $TL^i_2$ and $TL^o_2$, to which the signal of $f_2$ is transmitted, are all turned off.

When the remaining transmission lines operate as a parallel short-stub with an electrical length of quarterwave ($\lambda/4$) at $f_2$ from the node A by turning on the switches $S^i_{x2}$ and $S^o_{x2}$ and the switches $S^i_{x1}$ and $S^o_{x1}$, transmission lines other than $TL^i_2$ and $TL^o_2$ are RF-shorted.

Figure 12:
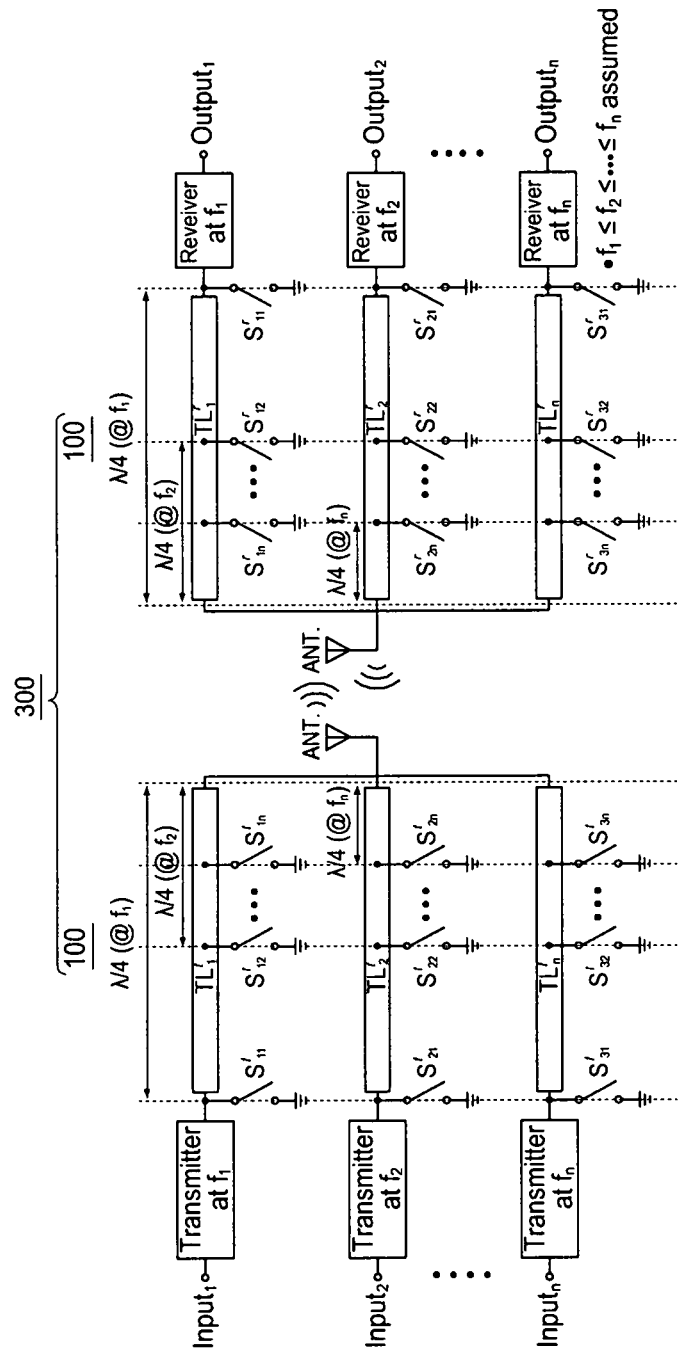
FIG. 12 is a view schematically illustrating the configuration of a multi-band transmitter and receiver system according to an embodiment of the present invention.

FIG. 12 is a view schematically illustrating the configuration of a multi-band transmitter and receiver system according to an embodiment of the present invention. A general transmitter and receiver system has a limited operating bandwidth due to the individual performance of the circuits involved. Even in a transmitter and receiver system with this limited bandwidth, as shown in FIG. 12, it is possible to implement a broadband transmitter and receiver system 300 by using the multi-band SPNT switch 100 as a time division multiplexing multiplexer.

In the present invention, an SPNT switch available in a multi-band, which includes an input terminal receiving a multi-band input signal and a variable quarterwave ($\lambda/4$)

transmission line on the transmission path of the switch, is implemented. The features of the present invention are as follows.

1. Variable short-stub with transmission line and SPST switch at position with electrical length of quarterwave (λ/4) of various frequency bands.

The maximum length of the transmission line included in the variable short-stub is configured to have an electrical length of quarterwave (λ/4) of the lowest frequency band among the operating frequency bands applied to the circuit.

The location where the SPST switch of the transmission line included in the variable short-stub is determined by the operating frequency bands during the SPNT switch configuration, and from the output terminal, the SPST switch is coupled to have an electrical length of quarterwave (λ/4) of each operating frequency band.

2. Multi-band SPNT switch composed of variable short-stubs connected in parallel at output terminal.

The SPST switches included in the transmission line of the path to be connected are turned off, and on the path that does not require connection, the SPST switch at an electrical location of quarterwave (λ/4) at the operating frequency is turned on to select the path of the SPNT switch by configuring it to be seen as an RF open node from the output terminal.

3. Broadband transmitter and receiver system that combines multi-band transmitter and multi-band receiver with multi-band SPNT switch.

4. Expanded multi-band M×N switch matrix with two connected multi-band SPNT switches A multi-band SPNT switch may be connected back-to-back at the output terminal to implement an M×N switch matrix that has a plurality of output terminals as well as a plurality of input terminals.

The present invention provides a parallel-structure multi-band SPNT switch in which a multi-band RF input signal is multiplexed by connecting an SPST switch in parallel to a transmission line.

At the output terminal, a parallel SPST switch is disposed on the transmission path so that it may be configured as a stepped variable short-stub of quarterwave (λ/4) at all operating frequencies of the input signal. In such a way, by using the variable short-stub to configure all the blocked paths other than the transmission path to be open nodes, it is possible to solve the problem of input/output matching and isolation caused by the quarterwave (λ/4) transmission line in the conventional structure, so that it may operate as a multi-band SPNT switch.

In addition, the multi-band SPNT switch of the present invention may be configured to have different or identical operating frequencies applied to the respective input terminals. Also, it is possible to arbitrarily select an individual input terminal to which a signal is applied, or to apply input signals at frequencies of overlapping bands.

Also, since the multi-band SPNT switch is based on a simple structure, it is possible to infinitely extend the number of input terminals. In addition, it is possible to expand the multi-band SPNT switch to a multi-band M×N switch matrix having multiple input and multiple output terminals.

According to the present invention, by allowing the transmission lines of the SPNT switches of the parallel structure to operate as the off-nodes at the common terminal with respect to different frequencies, it is possible to implement a parallel structure SPNT switch having excellent characteristics in multi-band frequencies.

In addition, it is possible to easily implement a multi-band parallel structure SPNT switch with a simple structure.

In addition, the electrical length of the transmission line may be easily changed by selecting different switch elements connected to the same transmission line.

In addition, it is possible to perform switching easily in correspondence to a frequency combination of various input signals.

Also, by using the SPST switch which is not related to the operation of the SPNT switch, it is possible to stably ground the transmission line in which no signal is applied.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A Single Pole N Throw (SPNT) switch comprising:
a transmission line (TL) unit including a plurality of transmission lines each connected between a plurality of selection terminals and a single common terminal; and
a SPST switch unit inducing a plurality of SPST switches for grounding each of the plurality of transmission lines,
wherein the SPST switch unit comprises a plurality of SPST switches connectable to different locations of each transmission line,
wherein the SPST switch unit allows the plurality of transmission lines to operate as open nodes at the common terminal for different frequencies by selectively connecting some of the SPST switches on each transmission line.

2. The SPNT switch of claim 1, wherein the SPST switch unit operates the SPST switches connected to the plurality of transmission lines so as to be grounded at a position separated by a quarterwave (λ/4) from the common terminal.

3. The SPNT switch of claim 2, wherein the SPST switch unit comprises SPST switches of the same number as the number of the transmission lines with respect to each of the plurality of transmission lines.

4. The SPNT switch of claim 3, wherein the SPST switch unit operates a SPST switch together, which is located closer to the selection terminal than a switch that operates as an open node at the common terminal at a preset frequency.

5. A SPNT switch matrix in which common terminals of SPNT switches having a plurality of selection terminals and a single common terminal are connected to each other,
wherein a Single Pole N Throw (SPNT) switch comprises:
a transmission line unit including a plurality of transmission lines each connected between the plurality of selection terminals and the single common terminal; and
a SPST switch unit including a plurality of SPST switches for grounding each of the plurality of transmission lines,
wherein the SPST switch unit comprises a plurality of SPST switches connectable to different locations of each transmission lines,
wherein the SPST switch unit allows the plurality of transmission lines to operate as open nodes at the common terminal for different frequencies by selectively connecting some of the SPST switches on each transmission line.

6. A transmitter and receiver system including a transmitting antenna and a receiving antenna, which are connected to each of common terminals of different SPNT switches having a plurality of selection terminals and a single common terminal, wherein a Single Pole N Throw (SPNT) switch comprises:

a transmission line unit including a plurality of transmission lines each connected between the plurality of selection terminals and the single common terminal; and a SPST switch unit including a plurality of SPST switches for grounding each of the plurality of transmission lines, wherein the SPST switch unit comprises a plurality of SPST switches connectable to different locations of each transmission lines, wherein the SPST switch unit allows the plurality of transmission lines to operate as open nodes at the common terminal for different frequencies by selectively connecting some of the SPST switches on each transmission line.

* * * * *